United States Patent [19]
Burney

[11] Patent Number: 4,597,465
[45] Date of Patent: Jul. 1, 1986

[54] CRUISE CONTROL SYSTEM AND METHOD WITH OVERSPEED SENSOR

[75] Inventor: Charles F. Burney, Orland, Calif.

[73] Assignee: A.R.A. Manufacturing Company, Grand Prairie, Tex.

[21] Appl. No.: 437,032

[22] Filed: Oct. 27, 1982

[51] Int. Cl.⁴ .............................................. F02D 11/10
[52] U.S. Cl. ...................... 180/176; 123/351; 180/179; 324/166
[58] Field of Search ................. 180/170, 175–179; 303/93; 324/166 X, 161, 162; 246/182 C; 364/565; 123/351

[56] References Cited
U.S. PATENT DOCUMENTS

| 4,170,274 | 10/1979 | Collonia | 180/176 |
| 4,352,403 | 10/1982 | Burney | 180/176 |
| 4,355,607 | 10/1982 | Blaney | 180/170 |
| 4,495,913 | 1/1985 | Gray | 180/170 |

*Primary Examiner*—John J. Love
*Assistant Examiner*—Joseph McCarthy
*Attorney, Agent, or Firm*—Cox & Smith Inc.

[57] ABSTRACT

Cruise control system and method for maintaining a vehicle such as an automobile at a desired speed. An overspeed sensor monitors the engine speed and disengages the system in the event of a sudden increase in the engine speed, as occurs, for example, when the clutch of a vehicle having a manual transmission is disengaged.

12 Claims, 2 Drawing Figures

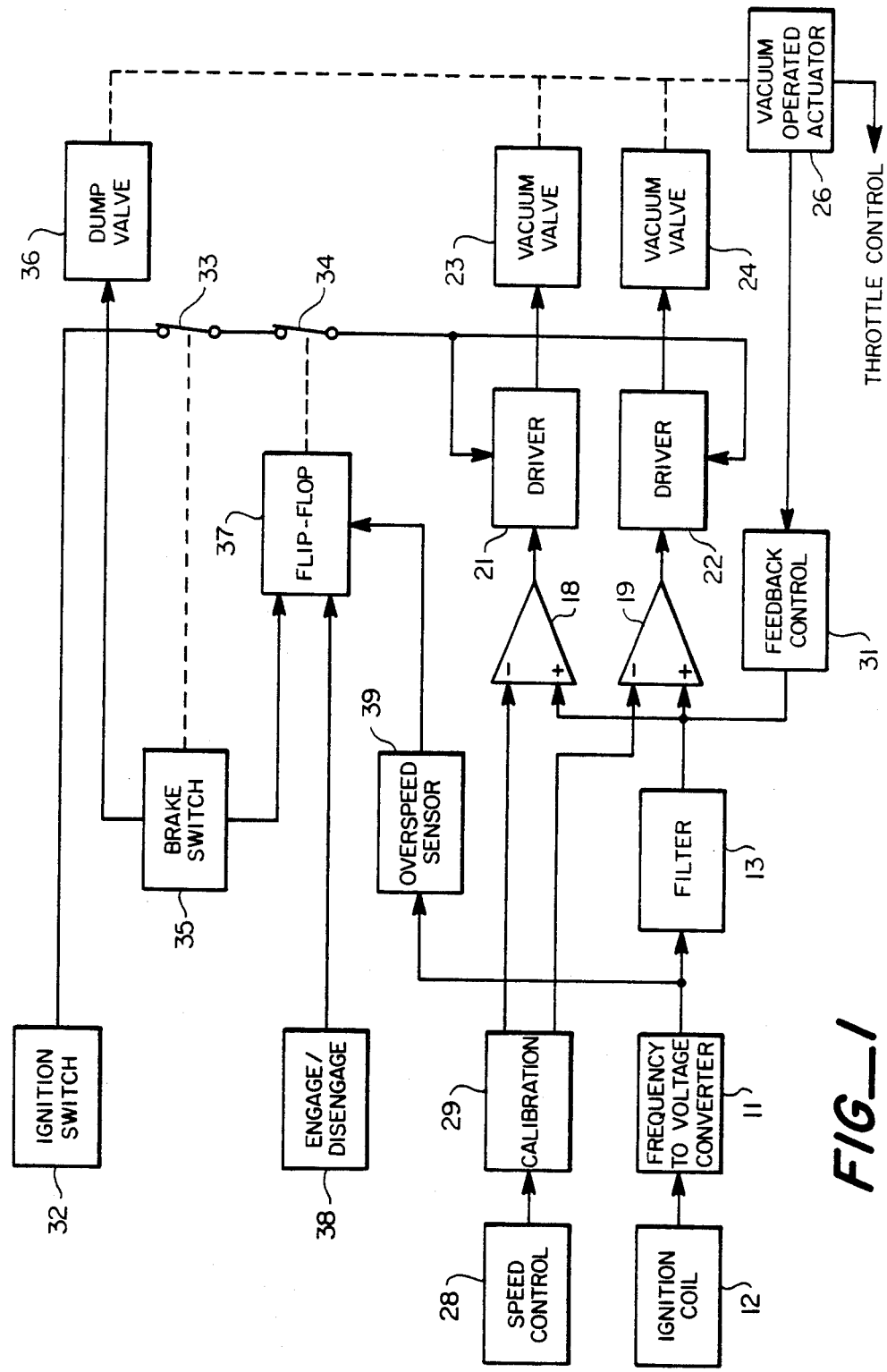
FIG_1

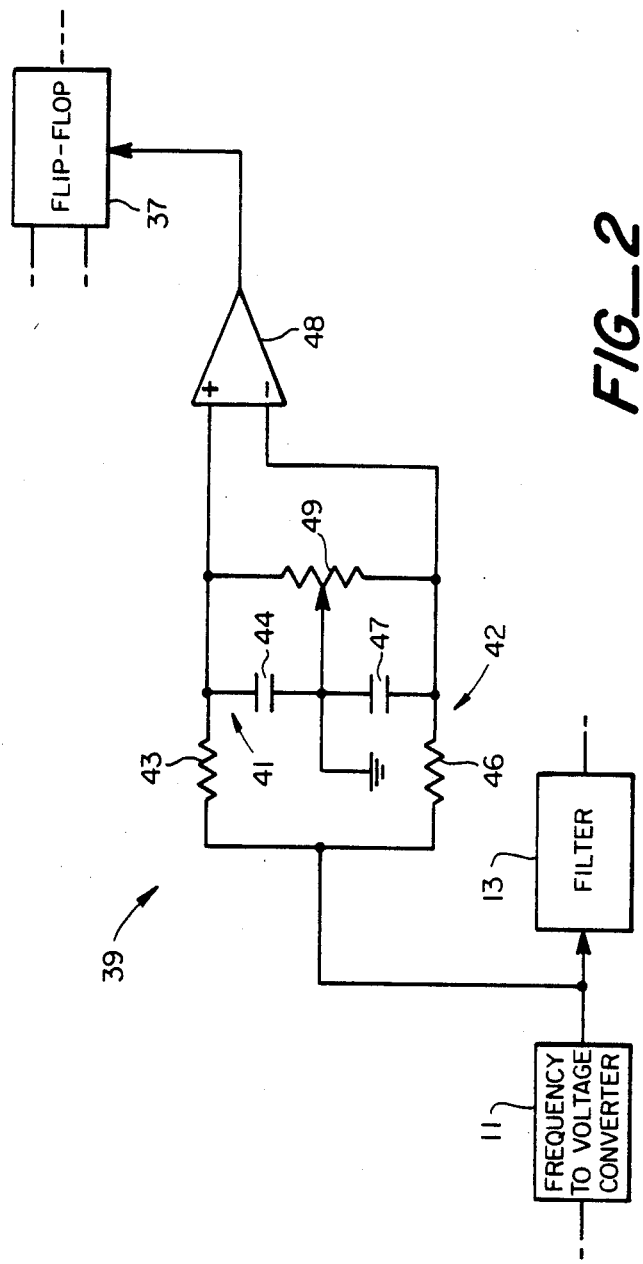

CRUISE CONTROL SYSTEM AND METHOD WITH OVERSPEED SENSOR

This invention pertains to cruise control systems for maintaining a vehicle such as an automobile at a desired speed.

Cruise controls heretofore provided for controlling the speed of an automobile have generally included some means for monitoring the speed at which the vehicle is actually traveling, and means connected to the throttle control for adjusting the speed of the engine to maintain the vehicle at a desired speed. One such system is described in U.S. Pat. No. 4,352,403, issued Oct. 5, 1982. With manual transmissions, a switch has been provided for releasing the engine from control by the system when the clutch is disengaged. Without the clutch switch, the engine speed could increase rapidly in an attempt to maintain the vehicle at the desired speed while the clutch is disengaged, producing a sudden surge in the vehicle speed when the clutch is reengaged.

It is in general an object of the invention to provide a new and improved cruise control system and method for maintaining a vehicle at a desired speed.

Another object of the invention is to provide a system and method of the above character in which a clutch switch is not required for use with a manual transmission.

These and other objects are achieved in accordance with the invention by providing a cruise control system and method in which the speed of the vehicle engine is monitored, and an overspeed signal is provided in the event that the engine speed changes at a rate greater than a predetermined rate, as might, for example, occur when the clutch of a vehicle with a manual transmission is disengaged. The engine is released from control by the system in response to the overspeed signal to prevent an undesired increase in the speed of the engine.

FIG. 1 is a block diagram of one embodiment of a cruise control system incorporating the invention.

FIG. 2 is a circuit diagram of the overspeed sensor in an embodiment of FIG. 1.

In FIG. 1, the invention is illustrated in connection with a cruise control system which is generally similar to the system described in U.S. Pat. No. 4,352,403, issued Oct. 5, 1982. This system includes a frequency-to-voltage converter 11 which is connected to the ignition coil 12 of the vehicle to provide a signal corresponding to the speed at which the vehicle is traveling. In one presently preferred embodiment, this converter comprises a National Semiconductor Model LM 2917-B converter which delivers a DC output voltage having a level corresponding to the frequency of the input pulses, with a small ripple at twice the frequency of the input pulses. The output of converter 11 is connected to the input of a filter 13 which removes some of the ripple and delivers an output signal having a DC level corresponding to the speed of the vehicle and a ripple of generally rectangular wave form having an amplitude on the order of 3-8 millivolts.

The output signal from filter 13 is applied to the (+) inputs of comparators 18, 19, and the outputs of the comparators are connected to the inputs of drivers 21, 22 which control the operation of solenoid valves 23, 24. These valves control the operation of a vacuum-operated actuator 26 which is connected to the throttle linkage of the vehicle. Upon application of a vacuum, the actuator moves the throttle to increase the engine speed, and when the vacuum is removed, the throttle is released from control by the actuator. Valve 23 is normally closed and is connected to a suitable source of vacuum such as the intake manifold of the engine. Valve 24 is normally open and is vented to the atmosphere.

A speed control 28 and a calibration circuit 29 apply reference signals to the (−) inputs of comparators 18, 19 in accordance with the desired speed of travel. As described more fully in the aforesaid patent, the speed control permits the operator of the vehicle to select the speed to be maintained, and the calibration circuit permits the system to be calibrated for use with a wide variety of vehicles. The reference signals from calibration circuit 29 differ in level by somewhat more than the ripple in the vehicle speed signal from filter 13, e.g. a 12 millivolt difference for a 3-8 millivolt ripple, and the lower level signal is applied to comparator 18.

When the system is actuated and the vehicle is traveling at less than the desired speed, i.e. the DC level of the vehicle speed signal is below the level of the reference signal applied to comparator 18, drivers 21 and 22 are both energized, opening valve 23 and applying vacuum to actuator 26 to increase the engine speed. The amount of correction decreases as the vehicle speed approaches the desired speed and the amount of the vehicle speed signal which is below the lower threshold level is reduced. When the vehicle speed exceeds the desired speed, i.e. the vehicle speed signal extends above the upper threshold level, drivers 21 and 22 are both deenergized, and valve 24 is allowed to open, venting the vacuum from actuator 26 and releasing the vehicle from control by the system. Once again, in amount of correction decreases as the vehicle speed approaches the desired speed and the portion of the operating cycle in which the vehicle speed is above the upper threshold level is reduced. When the vehicle is traveling at the desired speed, the vehicle speed signal falls entirely between the two reference levels, and valves 23 and 24 both remain closed, holding the throttle in a fixed position.

A feedback control 31 is connected to comparators 18, 19 for regulating the sensitivity or amount of correction provided by the system. The feedback signal is combined with the vehicle speed signal at the (+) inputs of the comparators and serves to counteract changes in the vehicle speed signal. In the preferred embodiment, the feedback control becomes operative when the vehicle speed is within about 10 mph of the desired signal.

Operating power for drivers 21, 22 is obtained from the ignition system of the vehicle and is controlled by ignition switch 32. Electronic switches 33, 34 are connected electrically in series between the ignition switch and the drivers, and all three of these switches must be closed for the system to operate. Switch 33 is connected to brake light switch 35 and opens to disengage the system when the brakes are applied. A dump valve 36 connected to actuator 26 is also connected to the brake light switch for venting the vacuum from the actuator to provide redundancy in disengaging the system when the brakes are applied.

Switch 34 is controlled by a flip-flop 37 which receives one input from brake light switch 35 to provide still further redundancy when the brakes are applied. This flip-flop receives a second input from an ENGAGE/DISENGAGE circuit 38 which is controlled by the operator of the vehicle to engage or disengage the cruise control.

An overspeed sensor 39 monitors the signal from frequency-to-voltage converter 11 and delivers an overspeed signal to flip-flop 37 to open switch 34 in the event of a sudden increase in the engine speed, as might, for example, occur when the clutch of a vehicle with a manual transmission is disengaged as the gears are shifted. Without some means for disengaging the system at this time, it could produce an undesired increase in the engine speed as it tries to compensate for the decrease in the vehicle speed which commonly occurs during shifting.

As illustrated in FIG. 2, overspeed sensor 39 comprises a rate-of-change detector having a pair of RC circuits 41, 42 to which the engine speed signal from converter 11 is applied. Circuit 41 comprises a resistor 43 and a capacitor 44 connected electrically in series between the converter output and ground, and circuit 42 comprises a resistor 46 and a capacitor 47 connected in series between the converter output and ground. The charges on capacitors 44, 47 are monitored by a comparator 48 which has its (+) and (−) inputs connected respectively to the junctions of the resistors and capacitors in circuits 41, 42. The output of comparator 48 is applied to flip-flop 37, and a potentiometer 49 is connected between the inputs of the comparator, with the wiper or adjustable contact of the potentiometer connected to ground. The potentiometer forms a differential voltage divider with the resistors in the RC circuits and provides means for setting the sensitivity of the detector.

Capacitors 44, 47 are charged by the engine speed signal from converter 11, and the two RC circuits have different time constants so that the capacitors are charged at different rates in response to changes in the engine speed signal. In one presently preferred embodiment, resistors 43, 46 have equal values (e.g. 33 kiloohms), capacitor 44 has a value of 1 microfarad, and capacitor 47 has a value of 10 microfarads. With these values, the voltage across capacitor 44 increases more rapidly than the voltage across capacitor 47 in response to a change in the engine speed signal. Potentiometer 45 has a relatively high resistance (e.g. 1 megohm), and it is adjusted to set the comparator in one of its output states in the steady state condition, i.e. when the capacitors are fully charged. A sudden change in the engine speed signal causes the voltage on capacitor 44 to rise relative to the voltage on capacitor 47, switching the comparator to its other output state to provide the overspeed signal. With slower changes in the engine speed, the voltages on the two capacitors follow the input signal at substantially equal rates, and the state of the comparator does not change. The difference in charging rates which will produce an output signal is set by potentiometer 49, which determines how close to the trip level the comparator operates in the steady state condition.

Operation and use of the cruise control system, and therein the method of the invention, are as follows. The system is installed in a vehicle having a manual transmission, and the speed to be maintained is set by the vehicle operator by means of speed control 28. The operator engages the system by pressing ENGAGE switch 38 and comparators 18, 19 compare the vehicle speed signal with the reference signals and actuate valves 23, 24 to control the application of vacuum to actuator 26. Once engaged, the system can be disengaged either by applying the brakes, pressing ENGAGE/DISENGAGE switch 38 again, or by turning off the ignition switch.

In the event of a sudden increase in the engine speed, e.g. when the clutch is disengaged during the shifting of gears, overspeed sensor 39 delivers an overspeed signal to flip-flop 37, opening switch 34 and releasing the vehicle from control by the system. Once disengaged, the system can be reengaged by pressing ENGAGE switch 38 again.

The invention has a number of important features and advantages. It provides a cruise control system which is easy to operate and is inherently safe because of the number of ways it can be disengaged and the redundancy which is provided in the case of braking. In addition, it can be installed in vehicles having manual transmissions without the need of a special clutch switch.

It is apparent from the foregoing that a new and improved cruise control system and method have been provided. While only certain presently preferred embodiments have been described in detail, as will be apparent to those familiar with the art, certain changes and modifications can be made without departing from the scope of the invention as defined by the following claims.

I claim:

1. In a system connected to the throttle of an engine for maintaining a vehicle at a predetermined speed, said engine having an ignition coil: means for providing a signal corresponding to the actual speed of the vehicle, means for providing a reference signal corresponding to the desired speed of the vehicle, means responsive to said signals for providing a speed correction signal in the event that the actual speed differs from the desired speed, actuator means responsive to the speed control signal for adjusting the throttle to maintain the vehicle at the desired speed, means connected to the ignition coil for providing an engine speed signal, first and second circuit means responsive to the engine speed signal for providing output signals which change at increasingly different rates with increasing rates of change in the engine speed, said first and second circuit means including capacitors which charge at different rates in response to changes in the engine speed signal, means responsive to the output signals for providing an overspeed signal in the event that the engine speed changes at a rate greater than a predetermined rate, and means responsive to the overspeed signal for releasing the throttle from control by the actuator means in the event of a sudden increase in the speed of the engine.

2. In a system connected to the throttle of an engine having an ignition coil for maintaining a vehicle at a predetermined speed: means connected to the ignition coil for providing an engine speed signal, first and second capacitors which charge at different rates in response to changes in the engine speed signal, means responsive to the charges on the capacitors for providing an overspeed signal in the event that the charge on one of the capacitors changes more than a predetermined amount relative to the charge on the other capacitor, and means responsive to the overspeed signal for releasing the throttle from control by the system in the event of a sudden increase in the speed of the engine.

3. The system of claim 2 including adjustable means for setting the predetermined amount of change which results in an overspeed signal.

4. In a system for controlling the speed of a vehicle: means for providing an electrical signal which varies in accordance with the speed of the vehicle's engine, first and second RC circuits each comprising a resistor and a capacitor connected electrically in series to which the engine speed signal is applied, the capacitors in said circuits being of different values and being charged at different rates in response to the engine speed signal, a comparator having first and second inputs connected respectively to the capacitors in the first and second RC circuits for providing an output signal in the event that the charge on one of the capacitors changes more than a predetermined amount relative to the charge on the other capacitor, and means responsive to the output signal for releasing the vehicle from control by the system in the event of a sudden increase in the speed of the engine.

5. The system of claim 4 including a potentiometer connected between the inputs of the comparator and having a wiper connected to a common point between the capacitors for applying a biasing signal to the comparator to set the amount of relative change in the capacitor charges which results in an output signal.

6. In a system connected to the throttle of an engine for maintaining a vehicle at a predetermined speed: means for providing a signal corresponding to the actual speed of the vehicle, means for providing a reference signal corresponding to the desired speed of the vehicle, means responsive to said signals for providing a speed correction signal in the event that the actual speed differs from the desired speed, actuator means responsive to the speed control signal for adjusting the throttle to maintain the vehicle at the desired speed, means for providing an engine speed signal having a level which varies in accordance with the speed of the engine, first and second RC circuits to which the engine speed signal is applied, said RC circuits having capacitors which are charged at different rates in response to changes in the level of the engine speed signal, comparator means for monitoring the charges on the capacitors and providing an overspeed signal in the event that the charge on one of the capacitors changes more than a predetermined amount relative to the charge on the other capacitor, and means responsive to the overspeed signal for releasing the throttle from control by the actuator means in the event of a sudden increase in the speed of the engine.

7. The system of claim 6 including means connected to the comparator means for setting the amount of relative change in the capacitor charges which results in an overspeed signal.

8. The system of claim 6 wherein the means for providing an engine speed signal is connected to the ignition coil of the engine.

9. In a system connected to the throttle of an engine for maintaining a vehicle at a predetermined speed: means for providing an engine speed signal having a level which varies in accordance with the speed of the engine, first and second RC circuits to which the engine speed signal is applied, said RC circuits having capacitors which are charged at different rates in response to changes in the level of the engine speed signal, comparator means for monitoring the charges on the capacitors and providing an overspeed signal in the event that the charge on one of the capacitors changes more than a predetermined amount relative to the charge on the other capacitor, and means responsive to the overspeed signal for releasing the throttle from control by the system in the event of a sudden increase in the speed of the engine.

10. The system of claim 9 including means connected to the comparator means for setting the amount of relative change in the capacitor charges which results in an overspeed signal.

11. The system of claim 9 wherein the means for providing an engine speed signal is connected to the ignition coil of the engine.

12. In a method of controlling the speed of a vehicle with a system having means for monitoring the speed at which the vehicle is traveling and means for adjusting the speed of the vehicle's engine to maintain the vehicle at a desired speed, the steps of: providing an electrical signal which varies in accordance with the speed of the engine, charging first and second capacitors of different values in accordance with the engine speed signal, monitoring the relative charges on the capacitors, providing an overspeed signal in the event that the charge on one of the capacitors changes more than a predetermined amount relative to the charge on the other capacitor, and releasing the engine from control by the system in response to the overspeed signal.

* * * * *